United States Patent
Ohara (10) Patent No.: US 10,870,247 B2
(45) Date of Patent: Dec. 22, 2020

(54) TIRE VULCANIZATION MOLD (71) Applicant: TOYO TIRE CORPORATION, Itami (JP)

(72) Inventor: Masaaki Ohara, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 16/327,098

(22) PCT Filed: Sep. 28, 2016

(86) PCT No.: PCT/JP2016/004381
§ 371 (c)(1),
(2) Date: Feb. 21, 2019

(87) PCT Pub. No.: WO2018/061052
PCT Pub. Date: Apr. 5, 2018

(65) Prior Publication Data
US 2019/0193354 A1 Jun. 27, 2019

(51) Int. Cl.
*B29D 30/06* (2006.01)
*B29D 30/72* (2006.01)
(Continued)

(52) U.S. Cl.
CPC .......... *B29D 30/0606* (2013.01); *B29C 33/10* (2013.01); *B29C 33/424* (2013.01);
(Continued)

(58) Field of Classification Search
CPC ................ B29D 30/0606; B29D 30/72; B29D 2030/0616; B29D 2030/0617; B29C 33/306
See application file for complete search history.

(56) References Cited

U.S. PATENT DOCUMENTS 5,382,402 A * 1/1995 Espie ................. B29C 33/10
156/394.1
6,491,854 B1* 12/2002 Sano ................. B22D 19/00
164/24
(Continued)

FOREIGN PATENT DOCUMENTS

CN 105459300 A 4/2016
JP 60-64809 A 4/1985
(Continued)

OTHER PUBLICATIONS

International Search Report dated Nov. 1, 2016, issued in counterpart International Application No. PCT/JP2016/004381 (1 page).
(Continued)

Primary Examiner — James P Mackey
(74) Attorney, Agent, or Firm — Westerman, Hattori, Daniels & Adrian, LLP (57) ABSTRACT A tire vulcanization mold 10 of an embodiment includes a side mold 14 having a side molding surface 20 for molding a side wall portion. The side mold 14 includes: a side mold body 24 having recesses 30 provided in the side molding surface 20; a side piece 26 fitted into the recess 30 to form a vent gap 28 with a wall surface of the recess; and a replacement piece 44 for displaying information closely fitted into a mounting hole 42 provided in the side molding surface 20 without a gap therebetween. The replacement piece 44 is provided in the side piece 26 or in the side mold body 24 so as not to span the side piece 26 and the side mold body 24.

10 Claims, 6 Drawing Sheets (51) Int. Cl.
  *B29C 33/42* (2006.01)
  *B29C 33/10* (2006.01)
  *B29C 33/30* (2006.01)
(52) U.S. Cl.
  CPC ............ *B29D 30/72* (2013.01); *B29C 33/306* (2013.01); *B29D 2030/0612* (2013.01); *B29D 2030/0616* (2013.01); *B29D 2030/0617* (2013.01); *B29D 2030/0618* (2013.01)

(56) References Cited

U.S. PATENT DOCUMENTS

| | | | |
|---|---|---|---|
| 6,830,722 | B2 | 12/2004 | Matsunaga |
| 7,021,914 | B2 * | 4/2006 | Hanya ............... B29C 33/10 249/141 |
| 2007/0259063 | A1 * | 11/2007 | Tanaka ............... B29C 33/10 425/36 |

FOREIGN PATENT DOCUMENTS

| | | |
|---|---|---|
| JP | 63-264308 A | 11/1988 |
| JP | 64-53816 A | 3/1989 |
| JP | 11-77694 A | 3/1999 |
| JP | H11-333844 A | 12/1999 |
| JP | 2000-202832 A | 7/2000 |
| JP | 2001-179751 A | 7/2001 |
| JP | 2002-52537 A | 2/2002 |
| JP | 2002-166424 A | 6/2002 |
| JP | 2002-326227 A | 11/2002 |
| JP | 2009-143488 A | 7/2009 |
| JP | 2010-533081 A | 10/2010 |
| JP | 2011-255768 A | 12/2011 |
| JP | 2012-135897 A | 7/2012 |
| WO | WO 2009/007790 * | 1/2009 |

OTHER PUBLICATIONS

Third Party Observation Mar. 10, 2020, issued in counterpart JP application No. 2018-541724, with English translation. (21 pages).
Office Action dated May 12, 2020, issued in JP application No. 2018-541725 (counterpart to U.S. Appl. No. 16/327,008), with English translation. (12 pages).
Office Action dated May 12, 2020, issued in counterpart JP application No. 2018-541724, with English translation. (8 pages).
Non-Final Office Action dated Apr. 1, 2020, issued in U.S. Appl. No. 16/327,008. (14 pages).
Third Party Observation Mar. 10, 2020, issued in JP application No. 2018-541725 (counterpart to U.S. Appl. No. 16/327,008), with English translation. (22 pages).
Notice of Allowance dated Mar. 31, 2020, issued in U.S. Appl. No. 16/327,103. (14 pages).
Office Action dated Jul. 20, 2020, issued in counterpart CN application No. 201680088740.2, with English translation (11 pages).
Office Action dated Sep. 22, 2020, issued in CN application No. 201680088746.X (counterpart to U.S. Appl. No. 16/237,103). (4 pages).

* cited by examiner

TIRE VULCANIZATION MOLD

TECHNICAL FIELD

An embodiment of the present invention relates to a tire vulcanization mold for vulcanization molding a tire.

BACKGROUND ART

The tire is manufactured by preparing an unvulcanized green tire and vulcanizing the green tire using the tire vulcanization mold while molding it into a predetermined shape. In the tire vulcanization mold, it is known that molding defects such as a recess (bare) occur on an outer surface of the tire due to accumulation of air between the tire vulcanization mold and the green tire, and it is required to discharge the air accumulated between the mold and the green tire in order to suppress the molding defects.

Therefore, for example, Patent Literature 1 proposes the tire vulcanization mold with a ring-shaped side mold formed by connecting a plurality of side segments divided in a tire circumferential direction in the tire circumferential direction, and with mating surfaces of the side segments as vent gaps. Further, Patent Literature 2 proposes the tire vulcanization mold in which an annular recess is provided in a side mold, a side ring is fitted into the annular recess, and fine grooves are provided in a circumferential surface of the side ring in contact with a wall surface of the annular recess as vent paths.

By the way, information such as tire size, load index, manufacturer name, date of manufacture, serial number and the like is displayed on a sidewall portion of the tire. These pieces of information are formed on the surface of the tire by an information transfer section provided on an inner surface of the tire vulcanization mold. A replacement piece for displaying information may be used in order to make the information transfer section replaceable with respect to a mold body (see Patent Document 3). The replacement piece is, for example, fitted into a mounting hole provided in a side molding surface of the side mold, and is configured to be replaceable.

CITATION LIST

Patent Literature

Patent Literature 1: JP-A-2012-135897
Patent Literature 2: JP-A-64-053816
Patent Literature 1: JP-A-11-077694

SUMMARY OF THE INVENTION

Technical Problem

In the case where the recess is provided in a side mold body in order to enable discharging of the air in the side mold, and a side piece is fitted into the recess to form the vent gap on the mating surfaces between the side mold body and the side piece, it is required to accurately form the vent gap in order to suppress the molding defects due to sticking out of rubber from the vent gap while ensuring venting performance. On the other hand, it is necessary for the replacement piece to be fitted into the mounting hole without a gap therebetween in order to prevent rubber from sticking out from its surroundings. In the case of providing the side piece to be mounted while securing the gap with the side mold body, and the replacement piece to be mounted on the side mold without a gap therebetween, there is a problem that required accuracy at the time of disassembling and reassembling the mold accompanying cleaning of the mold, or the like, is high and workability is impaired.

In view of the above, an object of the embodiment of the present invention is to improve workability at the time of disassembly and reassembly in the tire vulcanization mold including the side piece forming the vent gap together with the replacement piece in the side mold.

Means for Solving the Problems

An embodiment of the present invention is a tire vulcanization mold including an annular side mold having a side molding surface for molding a side wall portion of a tire. The side mold includes: a side mold body having recesses provided in the side molding surface; a side piece fitted into the recess to form a part of the side molding surface and forming a vent gap for discharging air with a wall surface of the recess; and a replacement piece for displaying information closely fitted into a mounting hole provided in the side molding surface without a gap therebetween. The replacement piece is provided in the side piece or in the side mold body so as not to span the side piece and the side mold body.

In an embodiment, a plurality of the recesses may be provided at intervals in a tire circumferential direction, a plurality of the side pieces may be respectively fitted into the plurality of recesses to form the side molding surface having an annular shape together with the side mold body, and the vent gaps may be provided between side surfaces on both sides in the tire circumferential direction of the side pieces and the wall surfaces of the recesses facing the side surfaces.

In this case, an inner end in a tire radial direction of the side piece may be positioned inwardly in the tire radial direction from an inner end in the tire radial direction of the side molding surface.

Further, the side mold body may include a bead ring fixing portion for fixing the bead ring on an inner side in the tire radial direction of the side molding surface. The recess may extend beyond the inner end in the tire radial direction of the side molding surface to the bead ring fixing portion. The inner end in the tire radial direction of the side piece fitted into the recess may be covered by the bead ring fixed to the bead ring fixing portion from an axially inner side of the tire.

Further, a gap may be provided between the inner end in the tire radial direction of the side piece and an inner end in the tire radial direction of the recess, and the gap between the inner ends may be set larger than the vent gaps on both sides in the tire circumferential direction of the side piece.

Advantage of the Invention

In the present embodiment, by providing the replacement piece in the side piece or in the side mold body so as not to extend over the side piece and the side mold body, it is possible to separately provide a fit of the side piece having gaps and a close contact fit of the replacement piece, thereby reducing the required accuracy at the time of disassembling and reassembling the mold accompanying cleaning of the mold, or the like, and thereby improving workability.

MODE FOR CARRYING OUT THE INVENTION

Hereinafter, embodiments will be described with reference to the drawings.

Figure 1:
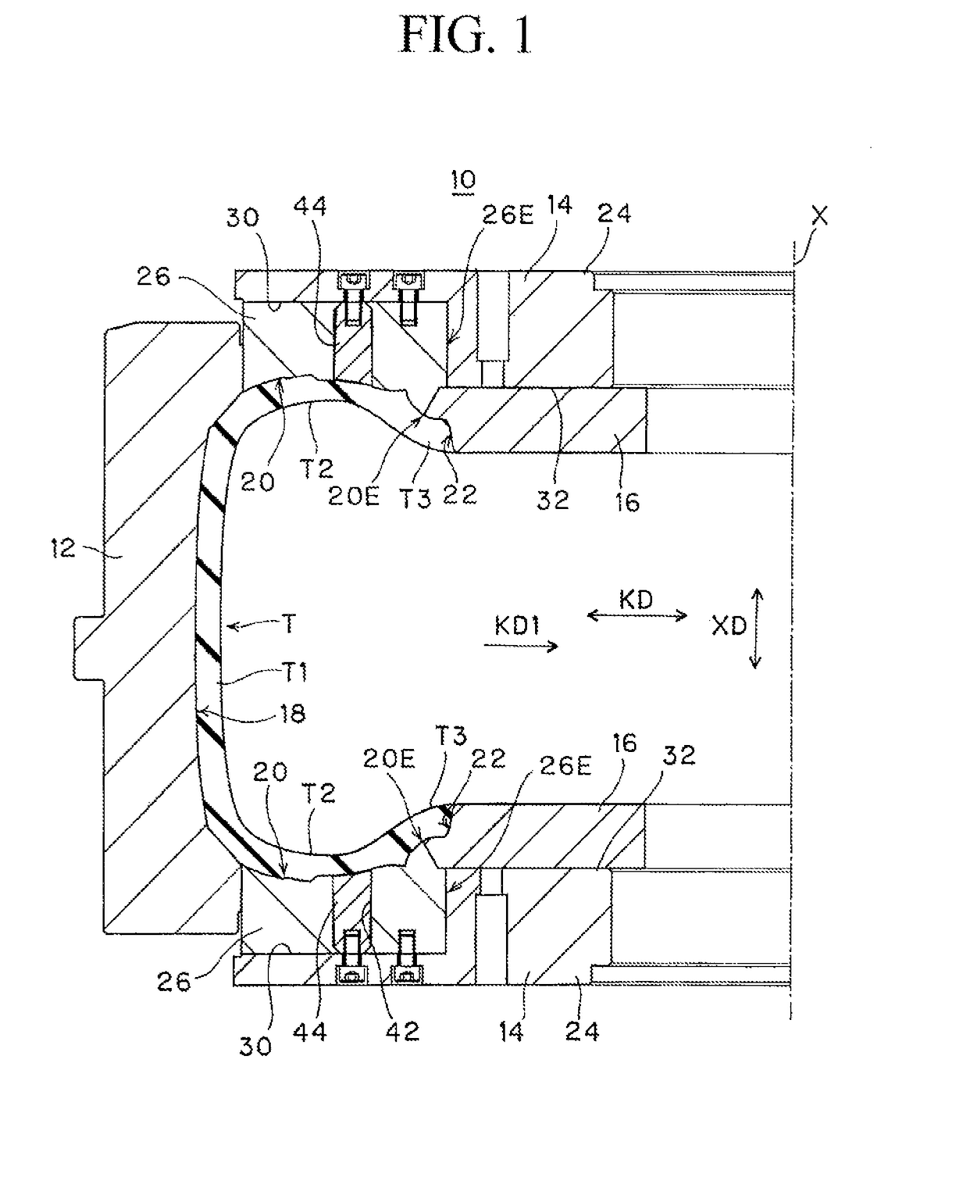
FIG. 1 is a half cross-sectional view showing a state of a tire vulcanization mold according to a first embodiment at the time of vulcanization.

FIG. 1 is a view showing a tire vulcanization mold (hereinafter simply referred to as a vulcanization mold) 10 according to a first embodiment, which is used for vulcanization molding a pneumatic tire T. The vulcanization mold 10 is a mold for vulcanization molding an unvulcanized green tire by setting its axial center X (the same as an axial center of the vulcanization mold 10) in a vertical direction, and includes a tread mold 12 for molding a tread portion T1 of a tire T, an upper and lower pair of side molds 14, 14 for molding side wall portions T2 of the tire T, and an upper and lower pair of bead rings 16, 16 for molding bead portions T3 of the tire T, to form a cavity which is a molding space of the tire T.

The tread mold 12 is a mold having a tread molding surface 18 for molding the tread portion T1, and is composed of a plurality of sectors divided in a tire circumferential direction. The plurality of sectors is provided to be expandable, contractible and displaceable in a tire radial direction (tire radial direction KD), and in a mold closed state, sectors adjacent in the circumferential direction are gathered together to form an annular shape.

The upper and lower side molds 14, 14 are annular, more specifically, thick-walled hollow disc-shaped molds, and are respectively provided on an inner circumferential side at both end portions in a tire axial direction XD of the tread mold 12. The upper and lower side molds 14, 14 have side molding surfaces 20, 20 for respectively molding the upper and lower side wall portions T2, T2.

The upper and lower bead rings 16, 16 are annular molds configured such that the bead portions T3 of the tire T are fitted therein, and are respectively provided on the inner circumferential side and an inner side of the tire axial direction of the upper and lower side molds 14, 14. The upper and lower bead rings 16, 16 have bead molding surfaces 22, 22 for respectively molding upper and lower bead portions T3, T3.

As shown in FIGS. 2 to 6, the side mold 14 includes a side mold body 24, a plurality of side pieces 26, and a plurality of vent gaps 28. Note that FIGS. 2 to 6 show the lower side mold 14, and the lower side mold 14 will be described also in the following description. Since the upper side mold 14 basically has the same structure with the lower side mold 14, a description thereof will be omitted.

The side mold body 24 has a plurality of recesses 30 provided at intervals in a tire circumferential direction CD in the side molding surface 20. Specifically, the side molding surface 20 having an annular shape is provided in an outer portion in the tire radial direction of the side mold body 24 having a hollow disc-shape, and an annular bead ring fixing portion 32 for fixing the bead ring 16 is provided on the inner side in the tire radial direction of the side molding surface 20, that is, in an inner portion in the tire radial direction of the side mold body 24. The bead ring 16 is placed on the bead ring fixing portion 32 and fixed to the side mold 14 by bolts or the like (not shown).

The plurality of recesses 30 for accommodating the side pieces 26 are provided at intervals in the tire circumferential direction CD in the side molding surface 20. A bottom surface of the recess 30 supporting the side piece 26 is constituted by a flat plate-like pedestal portion 34 forming a part of the side mold body 24. By providing the recesses 30, a protrusion 36 protruding upward from the pedestal portion 34 is provided between the recesses 30 adjacent to each other in the tire circumferential direction CD, and the recesses 30 and the protrusions 36 are alternately arranged in the tire circumferential direction CD.

Figure 6:
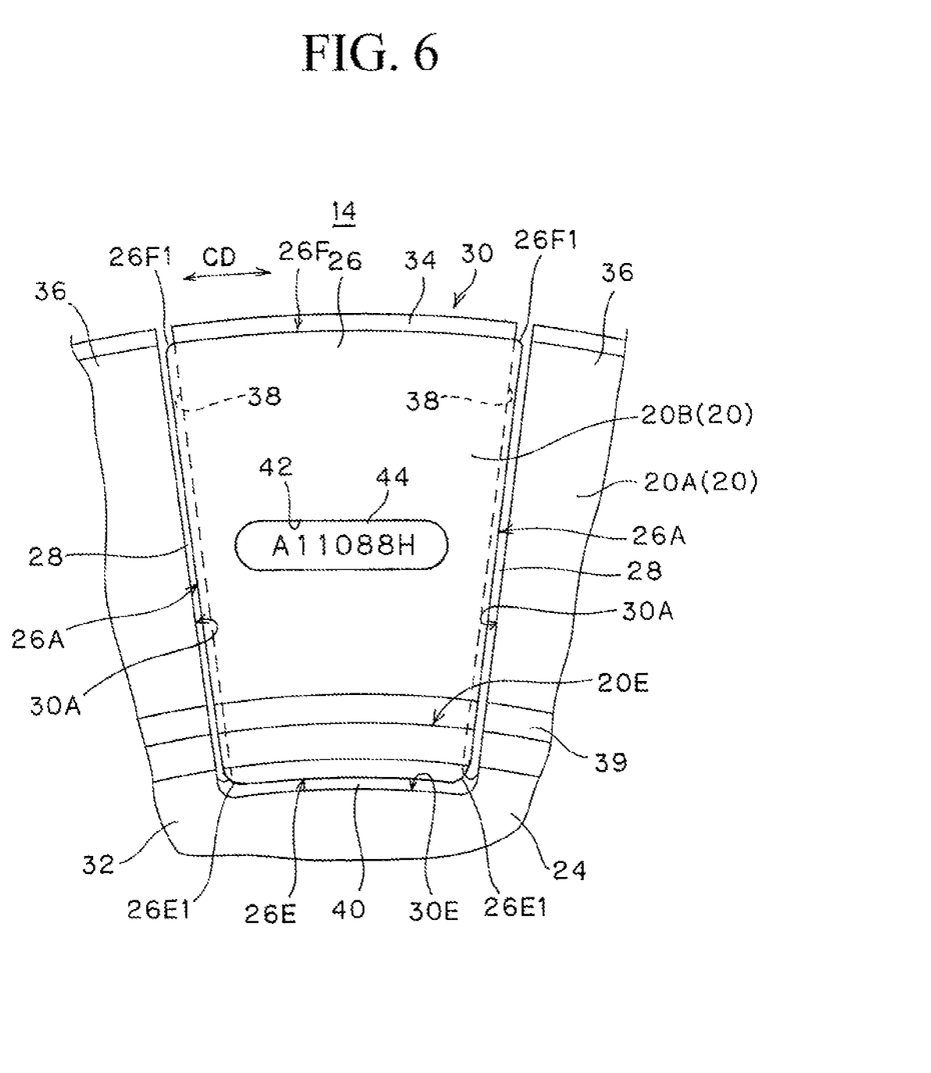
FIG. 6 is an enlarged plan view of the main portion of the side mold in the first embodiment.

As shown in FIG. 6, the recess 30 is a recess which is open in a fan shape on the side molding surface 20 in a plan view (view in the tire axial direction), and specifically has, in a plan view, the fan shape composed of an arcuate portion on the inner circumferential side, an arcuate portion on an outer circumferential side, and a pair of linear portions connecting ends of the both arcuate portions and extending in the tire radial direction. In this example, an outer portion in the tire radial direction of the recess 30 is open to an outer surface in the tire radial direction of the side mold body 24.

The protrusion 36 is provided radially outward in the tire radial direction from the bead ring fixing portion 32. In this example, a wall surface 30A (the same as a side surface of the protrusion 36) of the recess 30 which is a boundary between the recess 30 and the protrusion 36 is provided to be aligned with the tire radial direction KD, and the protrusion 36 has a fan shape in a plan view. An upper surface of the protrusion 36 constitutes a part 20A of the side molding surface 20.

The side piece 26 are respectively fitted into the recesses 30 of the side mold body 24, and constitutes the side mold 14 having a ring shape together with the side mold body 24. Therefore, the side piece 26 has a fan shape in a plan view like the recess 30. The side piece 26 fitted into the recess 30 is fixed to the side mold body 24, specifically to the pedestal portion 34 by a bolt 37.

An upper surface of the side piece 26 constitutes a part 20B of the side molding surface 20, and forms the side molding surface 20 having an annular shape together with a side molding surface 20A provided on the protrusion 36 of the side mold body 24. Specifically, the side molding surface 20 forms an annular shape continuous in the tire circumferential direction CD with the vent gaps 28 therebetween.

A length of the side piece 26 in the tire circumferential direction CD is slightly shorter than that of the recess 30. Therefore, in a state in which the side pieces 26 are fitted into the recesses 30, the vent gaps 28 extending in the tire radial direction KD are provided between the side surfaces 26A, 26A on both sides in the tire circumferential direction of the side pieces 26 and the wall surfaces 30A, 30A of the recess 30 facing the side surfaces. An upper end of the vent gap 28 is open to the side molding surface 20.

The vent gap 28 is a minute gap for discharging the air present between the green tire and the side molding surface 20 to the outside, and a dimension of the vent gap in the side molding surface 20 is set to such a dimension that the air passes therethrough but unvulcanized rubber does not intrude thereinto. As an example, a width of the vent gap 28 in the side molding surface 20 (distance between the side surface 26A of the side piece 26 and the wall surface 30A of the recess 30) is preferably 0.05 mm or less, may be 0.01 to 0.05 mm, and may be 0.01 to 0.03 mm.

Figure 5:
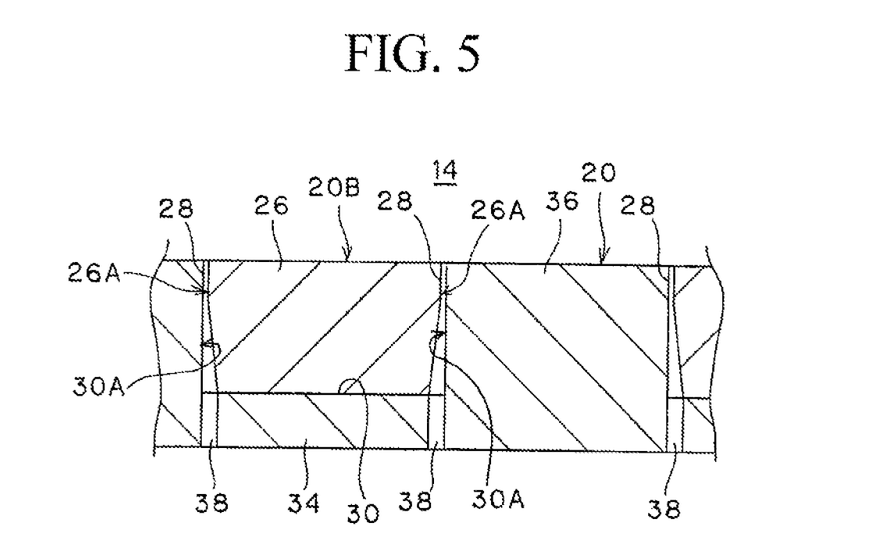
FIG. 5 is a cross-sectional view taken along a line V-V of FIG. 3.

As shown in FIG. 5, slits 38 penetrating the pedestal portion 34 in a thickness direction thereof are provided in the bottom surface of the recess 30. The slits 38 are cuts provided wider than the vent gap 28 and extending in the tire radial direction KD along the wall surfaces 30A on both sides in the tire circumferential direction of the recess 30 as shown in FIG. 6. An outer portion in the tire radial direction of the slit 38 is open to an outer surface in the tire radial direction of the pedestal portion 34. A lower end of the vent gap 28 is connected to the slit 38, and in this example, the vent gap 28 overlaps the slit 38 vertically over the entirety of the tire radial direction KD and is connected to the slit 38. The slit 38 is connected to a vent path (not shown), and the air present between the green tire and the side mold 14 flows into the vent path through the vent gap 28 and the slit 38, to be discharged to the outside of the tire vulcanization mold 10.

Figure 2:
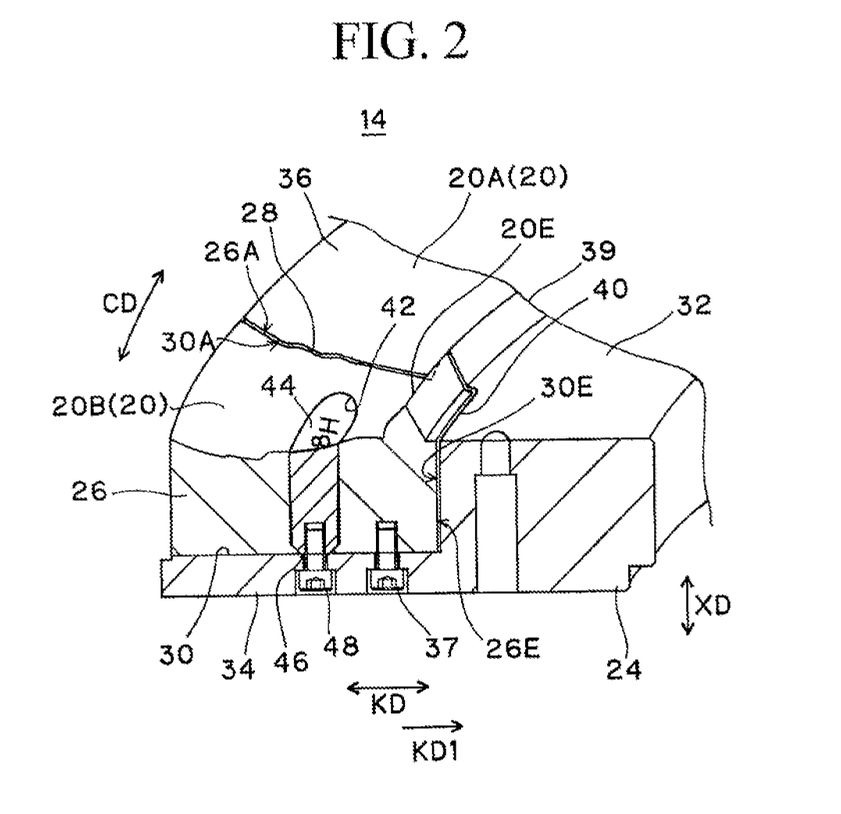
FIG. 2 is an enlarged perspective cross-sectional view of a main portion of a side mold in the first embodiment.
Figure 3:
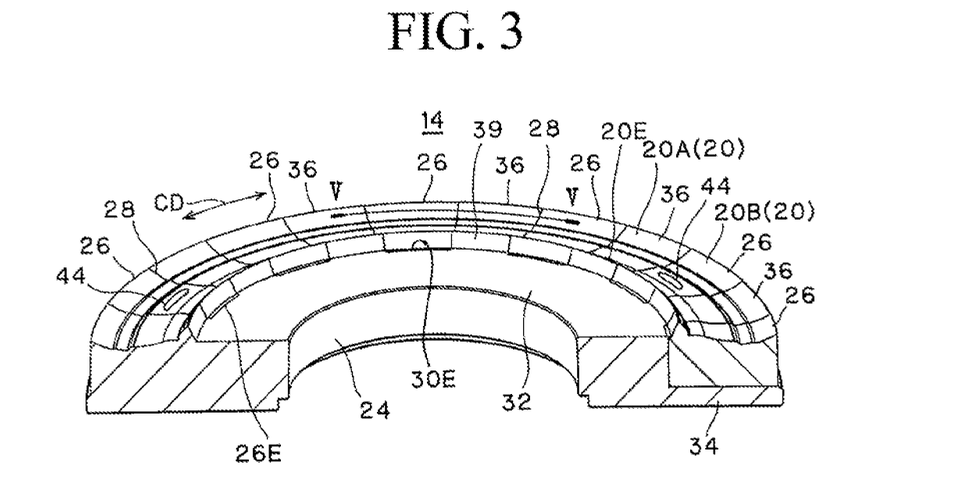
FIG. 3 is a perspective cross-sectional view of the side mold in the first embodiment.
Figure 4:
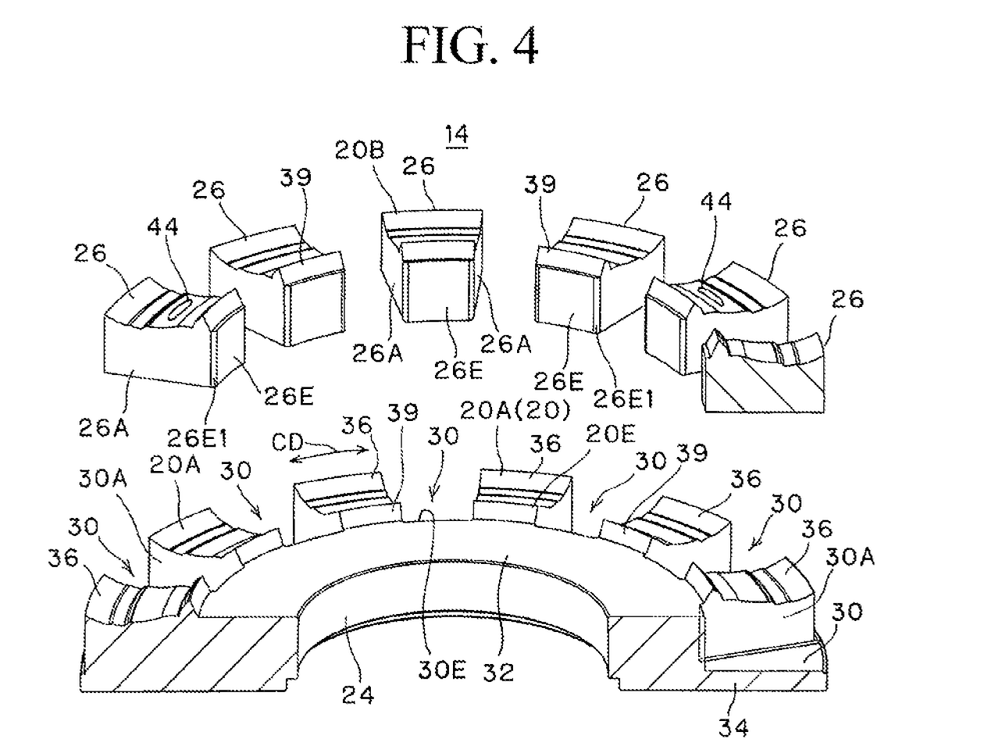
FIG. 4 is a perspective cross-sectional view showing the side mold in the first embodiment in disassembly.

In the present embodiment, as shown in FIGS. 1 and 2, an inner end 26E in the tire radial direction of the side piece 26 is positioned inwardly in the tire radial direction KD1 from an inner end 20E in the tire radial direction of the side molding surface 20. Here, the inner end 20E in the tire radial direction of the side molding surface 20 coincides with a mold dividing line in the cavity formed by the side mold 14 and the bead ring 16. Specifically, as shown in FIGS. 3 and 4, the recess 30 provided in the side mold body 24 extends to the bead ring fixing portion 32 beyond the inner end 20E in the tire radial direction of the side molding surface 20. That is, an inner end 30E in the tire radial direction of the recess 30 is positioned within the bead ring fixing portion 32. As shown in FIG. 1, the inner end 26E in the tire radial direction of the side piece 26 fitted into the recess 30 is covered from the inner side in the tire axial direction XD by the bead ring 16 fixed to the bead ring fixing portion 32, on the inner side in the tire radial direction of the inner end 20E of the side molding surface 20.

In this example, in the side mold 14, a protrusion 39 extending in the tire circumferential direction CD with the inner end 20E of the side molding surface 20 as an apex is provided on the tire molding surface 20. The plurality of recesses 30 are provided to divide the protrusion 39 in the tire circumferential direction CD, so that the protrusion 39 is intermittently provided in the side mold body 24 (see FIG. 4). Remaining portions corresponding to the protrusion 39 are formed in the side pieces 26, and by fitting the side pieces 26 into the recesses 30, the protrusion 39 is formed over the entire circumference in the tire circumferential direction CD.

As shown in FIG. 6, a gap (that is, an inner end gap) 40 is provided between the inner end 26E in the tire radial direction of the side piece 26 and the inner end 30E in the tire radial direction of the recess 30. Specifically, in a plan view shown in FIG. 6, the inner end 26E in the tire radial direction of the side piece 26 has an arcuate shape, and the inner end 30E in the tire radial direction of the recess 30 also has an arcuate shape. The gap 40 having a substantially constant width in the tire circumferential direction CD is provided between the two parts 26E and 30E. A clearance of the inner end gap 40 is set to be larger than that of the vent gaps 28, 28 on both sides in the tire circumferential direction of the side piece 26. As an example, while the vent gap 28 has a clearance of 0.05 mm or less, the inner end gap 40 is set to have a clearance of 0.5 mm or more, preferably about 0.5 to 1.0 mm.

Corner portions 26E1, 26E1 at both ends in the tire circumferential direction at the inner end 26E in the tire radial direction of the side piece 26 are formed in a curved surface shape having a radius of curvature of 2 mm or more. On the other hand, the radius of curvature of corner portions 26F1, 26F1 on both sides in the tire circumferential direction of an outer end 26F in the tire radial direction of the side piece 26 is set to be smaller than the radius of curvature of the corner portions 26E1, 26E1 on the inner diameter side, and the radius of curvature is set to, for example, 0.15 mm or less.

As shown in FIGS. 2 and 6, the side mold 14 is provided with a replacement piece 44 for displaying information closely fitted into a mounting hole 42 provided in the side molding surface 20 without a gap therebetween. The replacement piece 44 is a piece for displaying information including letters, symbols, figures, and the like such as tire size, load index, manufacturer name, date of manufacture, serial number, and the like, and recesses or protrusions for displaying these pieces of information are formed on the surface and are replaceably fitted into the mounting hole 42. The replacement piece 44 is tightly fitted into the mounting hole 42 so as not to form a gap around an entire periphery between the replacement piece 44 and the side mold body 42 of an outer periphery thereof.

In this example, the replacement piece 44 is provided in the side piece 26 so as not to span the side piece 26 and the side mold body 24, that is, so as not to span a boundary between the side piece 26 and the side mold body 24 (that is, the vent gap 28). More specifically, as shown in FIGS. 2 and 6, the replacement piece 44 is entirely provided in the side piece 26 in the side molding surface 20, that is, it is enclosed in the side piece 26. Note that the replacement piece 44 may be provided only in one side piece 26 or in a plurality of side pieces 26 as shown in FIGS. 3 and 4.

As shown in FIG. 2, the mounting hole 42 is recessed from the side molding surface 20B of the side piece 26 toward a back surface side. A bolt hole 46 is provided on a bottom surface side of the mounting hole 42, and is provided penetrating the side piece 26 and further penetrating the pedestal portion 34 of the side mold body 24. A bolt 48 is inserted into the bolt hole 46 from the back surface side of the side mold body 24 and fastened in a state where the replacement piece 44 is fitted into the mounting hole 42, so that the replacement piece 44 is fixed to the side piece 26.

When the pneumatic tire T is manufactured using the vulcanization mold 10 prepared as described above, the green tire (unvulcanized tire) is set in the vulcanization mold 10 and the mold is closed, and then by inflating a bladder (not shown) disposed on the inside, the green tire is pressed against an inner surface of the mold and kept in a heated state, so that the green tire is vulcanization molded.

In this case, according to the present embodiment, it is possible to discharge the air present between the green tire and the side mold 14 to the outside through the slit 38 from the vent gap 28 formed between the side piece 26 and the side mold body 24. Therefore, it is possible to suppress molding defects due to the remaining air.

With the vulcanization mold 10 according to the present embodiment, since the replacement piece 44 is enclosed in the side piece 26 so as not to span the boundary between the side piece 26 and the side mold body 24 in the side molding surface 20, it is possible to separately provide a fit of the side piece forming the vent gap 28 and a close contact fit of the replacement piece 44 without a gap. Therefore, when the vulcanization mold 10 is disassembled and reassembled accompanying cleaning or the like, it is easy to assemble both of them and workability can be improved. That is, if the replacement piece 44 is set to span the side piece 26 and the side mold body 24, it is difficult to mount the side piece 26 on the side mold body 24 while securing the vent gap 28 which is a uniform fine gap not larger than a predetermined value and mount the replacement piece 44 without providing any gap at a boundary position therebetween. This causes the molding defects due to sticking out of rubber around the side piece 26 or vent failure, or causes sticking out of rubber around the replacement piece 44. According to the present embodiment, such a problem can be suppressed.

Further, in the present embodiment, since the vent gaps 28 extending in the tire radial direction KD are provided on both sides of the plurality of side pieces 26 arranged in the tire circumferential direction CD, it is possible to effectively discharge the air present between the green tire and the side mold 14 from the plurality of vent gaps 28 provided in the tire circumferential direction CD. Therefore, it is possible to improve an effect of suppressing the molding defects by improving venting performance.

Further, although the side mold 14 is constituted by combining the plurality of side pieces 26, all the side pieces 26 are fixed to the side mold body 24, and thus errors of mounting positions generated when the plurality of side pieces are fixed to each other do not accumulate. Therefore, it is possible to accurately mount the side piece 26, thereby accurately setting a width dimension of the vent gap 28 formed between the side mold body 24 and the side piece 26.

In the present embodiment, when the side mold 14 is assembled, for example, the side piece 26 is fitted into the recess 30 of the side mold body 24, and in a state where a tape-like spacer called a shim tape having a predetermined thickness is sandwiched between the wall surface 30A of the recess 30 and the side surface 26A of the side piece 26, the side piece 26 is fixed to the side mold body 24 by the bolt or the like, and then it is possible to assemble the side mold 14 with or without removing the spacer. Therefore, it is possible to easily and accurately set the width dimension of the vent gap 30.

Moreover, in the present embodiment, since the inner end 26E in the tire radial direction of the side piece 26 is positioned inwardly in the tire radial direction KD1 from the inner end 20E in the tire radial direction of the side molding surface 20, that is, is not positioned within the side molding surface 20, accurate alignment with the side mold body 24 is not necessary at the tire radial direction inner end 26E of the side piece 26.

Therefore, the gap 40 with the side mold body 24 at the inner end 26E can be used as an allowance for strictly setting the vent gaps 28, 28 on both sides in the tire circumferential direction of the side piece 26. That is, for example, by setting the gap 40 larger than the vent gaps 28, 28 on both sides in the tire circumferential direction of the side piece 26, it is possible to absorb a positioning error of the side piece 26 using the gap 40. Therefore, it is possible to further improve dimensional accuracy of the vent gap 28.

Further, in the case where the side piece 26 is displaced in the tire radial direction KD by utilizing the gap 40 at the inner end 26E of the side piece 26 to absorb the positioning error as described above, it is more difficult to fit the replacement piece 44 without a gap if the replacement piece 44 is set to span the boundary between the side piece 26 and the side mold body 24. However, in the present embodiment, since the replacement piece 44 does not span the boundary as described above, such a problem does not occur.

Further, since precise fitting accuracy between the corner portion 26E1 on the inner diameter side of the side piece 26 and the corresponding corner portion of the recess 30 is not required, workability can be improved. Further, by setting the radius of curvature of the corner portion 26E on the inner diameter side of the side piece 26 to 2 mm or more, contact with the corresponding corner portion of the recess 30 can be suppressed. Meanwhile, by setting the corner portion 26F1 on the outer diameter side of the side piece 26 to be smaller than the radius of curvature of the corner portion 26E1 on the inner diameter side, it is possible to suppress the unvulcanized rubber from sticking out on the outer diameter side of the side piece 26.

Figure 7:
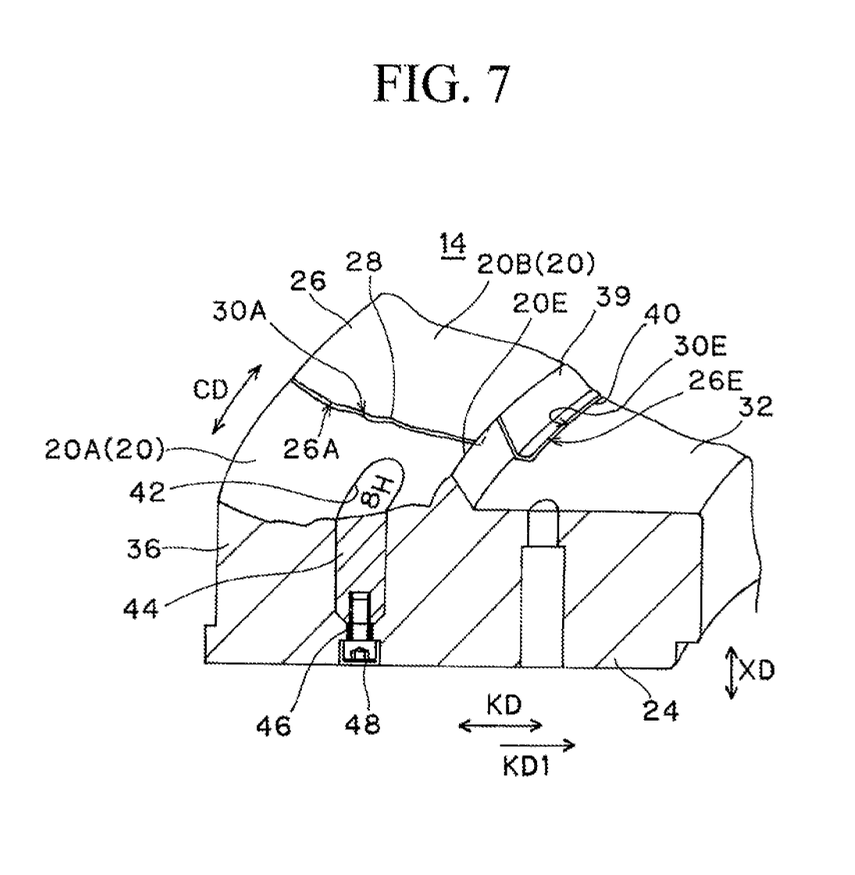
FIG. 7 is an enlarged perspective cross-sectional view of the main portion of the side mold according to a second embodiment.
Figure 8:
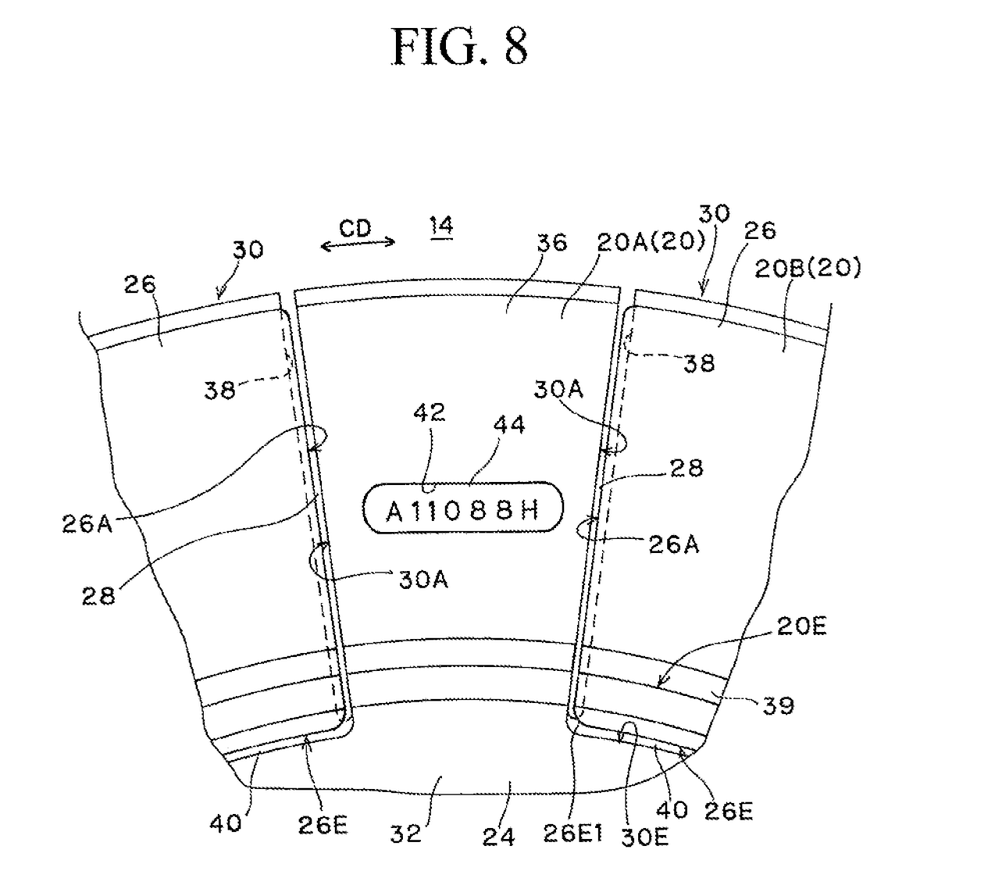
FIG. 8 is an enlarged plan view of the main portion of the side mold according to the second embodiment.

FIGS. 7 and 8 are views showing a main portion of the side mold 14 according to a second embodiment. The second embodiment is different from the first embodiment in that the replacement piece 44 is provided in the side mold body 24 instead of in the side piece 26.

That is, in the second embodiment, the replacement piece 44 is entirely provided in the side mold body 24, specifically in the protrusion 36 in the side molding surface 20 so as not to span the side piece 26 and the side mold body 24, and is enclosed in the side mold body 24.

As shown in FIG. 7, in this example, the mounting hole 42 is recessed from the side molding surface 20A of the side mold body 24 (protrusion 36) toward the back surface side. The bolt hole 46 is provided on the bottom surface side of the mounting hole 42 to penetrate the back surface side of the side mold body 24. The bolt 48 is inserted into the bolt hole 46 from the back surface side of the side mold body 24 and fastened in a state where the replacement piece 44 is fitted into the mounting hole 42, so that the replacement piece 44 is fixed to the side mold body 24.

In this way, the replacement piece 44 may be provided not only to be enclosed in the side piece 26 but also to be enclosed in the side mold body 24. Note that the replacement piece 44 may be provided only in one protrusion 36 or in a plurality of protrusions 36. Further, a structure in which the replacement piece 44 is enclosed in the side mold body 24 may be combined with a structure in which the replacement piece 44 is enclosed in the side piece 26 as in the first embodiment. Other structures and operational effects of the second embodiment are similar to those of the first embodiment, and description thereof will be omitted.

In the above embodiments, the outer portion in the tire radial direction of the recess 30 is provided open to the outer surface in the tire radial direction of the side mold body 24, however, it may be formed such that an annular wall continuous over the entire circumference in the tire circumferential direction is provided on an outer circumferential end portion of the side mold body 24, and the outer portion in the tire radial direction of the recess 30 is not open to the outer surface in the tire radial direction of the side mold body 24.

Further, the side piece 26 is not limited to a case where the plurality of side pieces 26 having the same length in the tire circumferential direction CD are provided at regular intervals, but the side pieces 26 having the same length in the tire circumferential direction CD may be provided at irregular intervals, or the side pieces 26 having different lengths in the tire circumferential direction CD may be provided at regular intervals or at irregular intervals. The same applies to the protrusions 36 between the recesses 30. Furthermore, it is not limited to a case where the plurality of side pieces 26 are provided, but only one side piece 26 may be provided.

Further, shapes of the side piece 26 and the recess 30 are not limited to the fan shape as described above. For example, an annular recess extending in the entire circumference in the tire circumferential direction may be provided in the side molding surface, and a ring-shaped side piece fitted into the recess may be provided, so that annular vent gaps are formed between the side mold main body 24 and the inner circumferential side and the outer circumferential side of the ring-shaped side piece.

Furthermore, a vent structure with the side piece 26 according to the above embodiment and a structure of the replacement piece 44 may be provided in both of the upper and lower side molds 14, 14, but may be provided in only one side mold 14.

Although several embodiments have been described above, these embodiments have been presented by way of example and are not intended to limit the scope of the invention. These novel embodiments can be implemented in various other forms, and various omissions, substitutions, and changes can be made without departing from the scope of the invention.

DESCRIPTION OF REFERENCE NUMERALS AND SIGNS

T: pneumatic tire, T2: side wall portion, 10: tire vulcanization mold, 12: tread mold, 14: side mold, 16: bead ring, 20: side molding surface, 20E: inner end in tire radial direction of side molding surface, 24: side mold body, 26: side piece, 26A: side surface on both sides in tire circumferential direction of side piece, 26E: inner end in tire radial direction of side piece, 28: vent gap, 30: recess, 30A: wall surface of recess, 30E: inner end in tire radial direction of recess, 32: bead ring fixing portion, 42: mounting hole, 44: replacement piece, CD: tire radial direction, KD: tire radial direction, XD: tire axial direction.

The invention claimed is:

1. A tire vulcanization mold comprising an annular side mold having a side molding surface for molding a side wall portion of a tire, wherein
the side mold comprises:
a side mold body having a plurality of recesses provided in the side molding surface at intervals in a tire circumferential direction;
a plurality of side pieces fitted into the plurality of recesses to form the side molding surface having an annular shape together with the side mold body and forming a plurality of vent gaps provided between side surfaces on both sides in the tire circumferential direction of the plurality of side pieces and the wall surfaces of the plurality of recesses facing the side surfaces for discharging air with a wall surface of the recess; and
a replacement piece for displaying information fitted into a mounting hole provided in the side molding surface without a gap therebetween, and
the replacement piece is provided in the side piece or in the side mold body so as not to span the side piece and the side mold body.

2. The tire vulcanization mold according to claim 1, wherein an inner end in a tire radial direction of each of the plurality of side pieces is positioned inwardly in the tire radial direction from an inner end in the tire radial direction of the side molding surface.

3. The tire vulcanization mold according to claim 2, wherein
the side mold body comprises a bead ring fixing portion for fixing a bead ring on an inner side in the tire radial direction of the side molding surface,
each of the plurality of recesses extends beyond the inner end in the tire radial direction of the side molding surface to the bead ring fixing portion, and
the inner end in the tire radial direction of each of the plurality of side pieces fitted into the recess is covered by the bead ring fixed to the bead ring fixing portion from an axially inner side of the tire.

4. The tire vulcanization mold according to claim 2, wherein
an inner end gap is provided between the inner end in the tire radial direction of each of the plurality of side pieces and an inner end in the tire radial direction of each of the plurality of recesses, and
the inner end gap is set larger than the vent gaps on both sides in the tire circumferential direction of the side piece.

5. The tire vulcanization mold according to claim 3, wherein
an inner end gap is provided between the inner end in the tire radial direction of each of the plurality of side pieces and an inner end in the tire radial direction of each of the plurality of recesses, and
the inner end gap is set larger than the vent gaps on both sides in the tire circumferential direction of the side piece.

6. The tire vulcanization mold according to claim 1, wherein a protrusion is provided on the tire molding surface extending in the tire circumferential direction with an inner end of the side molding surface as an apex of the protrusion.

7. The tire vulcanization mold according to claim 6, wherein the plurality of recesses are provided to divide the protrusion in the tire circumferential direction to form a plurality of protrusions, wherein a first portion of the plurality of protrusions is intermittently provided in the side mold body, and a second portion of the plurality of protrusion are each formed on each of the plurality of the side pieces, so that by fitting the plurality of side pieces into the plurality of recesses, the first portion of the plurality of protrusions and the second portion of the plurality of protrusions form the protrusion over an entire circumference of the tire molding surface in the tire circumferential direction.

8. The tire vulcanization mold according to claim 1, wherein a first inner corner portion and a second inner corner portion formed at each end in the tire circumferential direction at an inner end in the tire radial direction of each of the plurality of the side pieces are curved having a radius of curvature of 2 mm or more.

9. The tire vulcanization mold according to claim 8, wherein a first outer corner portion and a second outer corner portion formed at each end in the tire circumferential direction at an outer end in the tire radial direction of each of the plurality of the side pieces are curved having a radius of curvature which is set smaller than the radius of curvature of the first inner corner portion and the second inner corner portion.

10. The tire vulcanization mold according to claim 9, wherein the radius of curvature of the first outer corner portion and the second outer corner portion is 0.15 mm or less.

* * * * *